United States Patent
Zhu et al.

(10) Patent No.: US 7,690,026 B2
(45) Date of Patent: Mar. 30, 2010

(54) DISTRIBUTED SINGLE SIGN-ON SERVICE

(75) Inventors: Bin Zhu, Edina, MN (US); Tierui Chen, Wuhan (CN); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1104 days.

(21) Appl. No.: 11/208,509

(22) Filed: Aug. 22, 2005

(65) Prior Publication Data

US 2007/0044143 A1   Feb. 22, 2007

(51) Int. Cl.
    *G06F 17/30* (2006.01)
(52) U.S. Cl. ......................................... 726/8
(58) Field of Classification Search ............. 726/8
    See application file for complete search history.

(56) References Cited

U.S. PATENT DOCUMENTS

| | | | |
|---|---|---|---|
| 5,706,349 A | | 1/1998 | Aditham et al. |
| 6,816,970 B2 * | | 11/2004 | Morgan et al. ............ 713/183 |
| 7,055,032 B2 * | | 5/2006 | Sandhu et al. ............ 713/171 |

2005/0027989 A1   2/2005   Sandhu et al.

FOREIGN PATENT DOCUMENTS

| | | |
|---|---|---|
| KR | 20020095815 | 12/2002 |
| KR | 20040097505 | 11/2004 |
| WO | WO0067415 A2 | 11/2000 |
| WO | WO0172009 A2 | 9/2001 |

OTHER PUBLICATIONS

PCT International Search Report and Written Opinion for Application No. PCT/US2006/032156 mailed on Jan. 31, 2007, pp. 1-10.
Singapore Written Opinion from the Danish Patent and Trademark Office for Application No. 200800944-1 mailed on Mar. 4, 2009, 9 pgs.
First Office Action for Chinese Patent Application No. 200680030296.5 dispatched on Apr. 24, 2009.
US 5,373,559, 12/1994, Kaufman et al. (withdrawn)

* cited by examiner

*Primary Examiner*—Kambiz Zand
*Assistant Examiner*—Aubrey H Wyszynski
(74) *Attorney, Agent, or Firm*—Lee & Hayes, PLLC

(57) ABSTRACT

The described implementations relate to establishing authenticated communication between a client computing device and a service provider. In one implementation, once a registration procedure is complete, multiple authentication servers are used by a client computing device and a service provider to facilitate the establishment of an authenticated communication session. However, the authentication servers are not necessarily trusted authorities. That is, secrets of the various described devices are not revealed to each other.

12 Claims, 7 Drawing Sheets

DISTRIBUTED SINGLE SIGN-ON SERVICE

BACKGROUND

Online users are typically required to maintain a set of authentication credentials (e.g., a username and password) for each service provider he or she is entitled to access. These users often face the dilemma of using different authentication credentials for each individual service provider in order to maintain a high level of security, or using the same authentication credentials for the various service providers resulting in a diminished level of security. Frequently, the latter is chosen over the former, as it is difficult to memorize and maintain numerous authentication credentials. In addition, aside from the security implications, requiring users to enter authentication credentials each time access to a service provider is necessary is a generally awkward and time consuming procedure.

Various conventional technologies have been proposed to alleviate or eliminate the need to maintain multiple sets of authentication credentials that provide access to various online services. One such technology utilizes a centralized credential management that provides authentication services for participating service providers. After a user initially establishes a relationship and authenticates with the centralized credential management, the centralized credential management administers the authentication process when the user subsequently requests access to any of the participating service providers. This technology significantly reduces the complexity of having to request access of numerous service providers. The centralized credential management transparently handles the particulars of authenticating with various participating service providers, while a high level of user security is maintained.

Current conventional centralized credential management technologies are not suitable for all online environments. One conventional centralized credential management technology requires a user to authenticate with an authentication server. After authentication, the authentication server issues an authentication ticket to the user. The authentication ticket is used by the user to obtain access to a server that issues service access tickets. The server will issue a service access ticket to the user if the authentication ticket is valid. The user may then use the service access ticket to gain access to a service provider.

The described conventional centralized credential management technology provides secure access functionality if the service providers are centrally maintained. However, secure access to the service providers is compromised if the service providers are part of a network having numerous disparate users/entities, such as the Internet.

Another conventional authentication technology uses a centralized database that contains registered users and their associated authentication credentials. Each of the registered users has a unique 64-bit ID number. This conventional authentication technology also assigns each participating service provider a unique ID. These unique IDs are also kept in a centralized database. The participating service providers agree to implement a server component that facilitates secure communication with an entity administering the centralized databases. When a registered user attempts to authenticate with a participating service provider, the user is transparently redirected to the administering entity to facilitate the authentication. The implemented secure communication path between the participating service provider and the administering entity helps to ensure the authentication request granted.

The authentication technology discussed above provides secure Web-based authentication. However, the technology has not been widely adopted by the Internet community. This is mainly due to the centralized database design feature of the technology. Some service providers do not approve of the technology because central databases are used. In particular, a service provider must rely on an entity administering the centralized databases to ensure successful user authentication. If the entity experiences technical difficulties, user authentication may be disrupted. This possibility of disruption, which is not service provider controllable, may be a risk the service provider is not willing to take. Furthermore, the use of centralized databases makes the authentication technology especially prone to attacks by hackers and malware.

SUMMARY

Implementations described herein relate to establishing authenticated communication between a client computing device and a service provider. The communication is made possible without the use of a trusted authority that holds secrets of a client computing device and a service provider.

After a registration process, a client computing device uses authentication servers to request authenticated communication with a service provider. The client computing device may use any set of a plurality of authentication servers that it is registered with, where the number of servers in the set is large than or equal to a threshold value, to request authenticated communication with a service provider. The service provider should also be registered with the authentication servers the client computing device may use to establish authenticated communication.

A client computing device may send a service provider an authentication request that includes its unique identifier ID and an encrypted authentication token that includes the unique identifier ID, a network address such as IP address of the device and a nonce. The encrypted authentication token was received in an earlier communication with authentication servers. Each authentication server used a split key, obtained from the service provider the client computing device is desiring authenticated communication with, to encrypt and generate an partial authentication token. The service provider uses an undisclosed secret key to decrypt the authentication token, thereby exposing the encrypted authentication information. This information, along with the sent unique identifier ID, is used by the service provider to decide if authenticated communication will be authorized.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Overview

Systems and methods for authenticating with a service provider are described. In the following, a broad discussion of the procedures utilized between client, service provider and authentication devices to establish authenticated communication between a client computing device and service provider device is provided. This discussion will make use of an exemplary environment illustrated in FIG. 1. Exemplary implementations of various procedures used between various devices are then described in further detail. In particular, a detailed discussion of a procedure used by a client computing device to obtain authenticated access to a service provider is provided in conjunction with FIG. 2; a detailed discussion of a service provider registration procedure with an authentication server is provided in conjunction with FIG. 3; a detailed discussion of a client computing device registration procedure with an authentication server is provided in conjunction with FIG. 4; and a detailed discussion of a client computing device authentication procedure with an authentication server is provided in conjunction with FIG. 5. Finally, exemplary implementations of a service provider, client computing device and authentication server are discussed in conjunction with FIGS. 6-8, respectively.

Exemplary Environment

Figure 1:
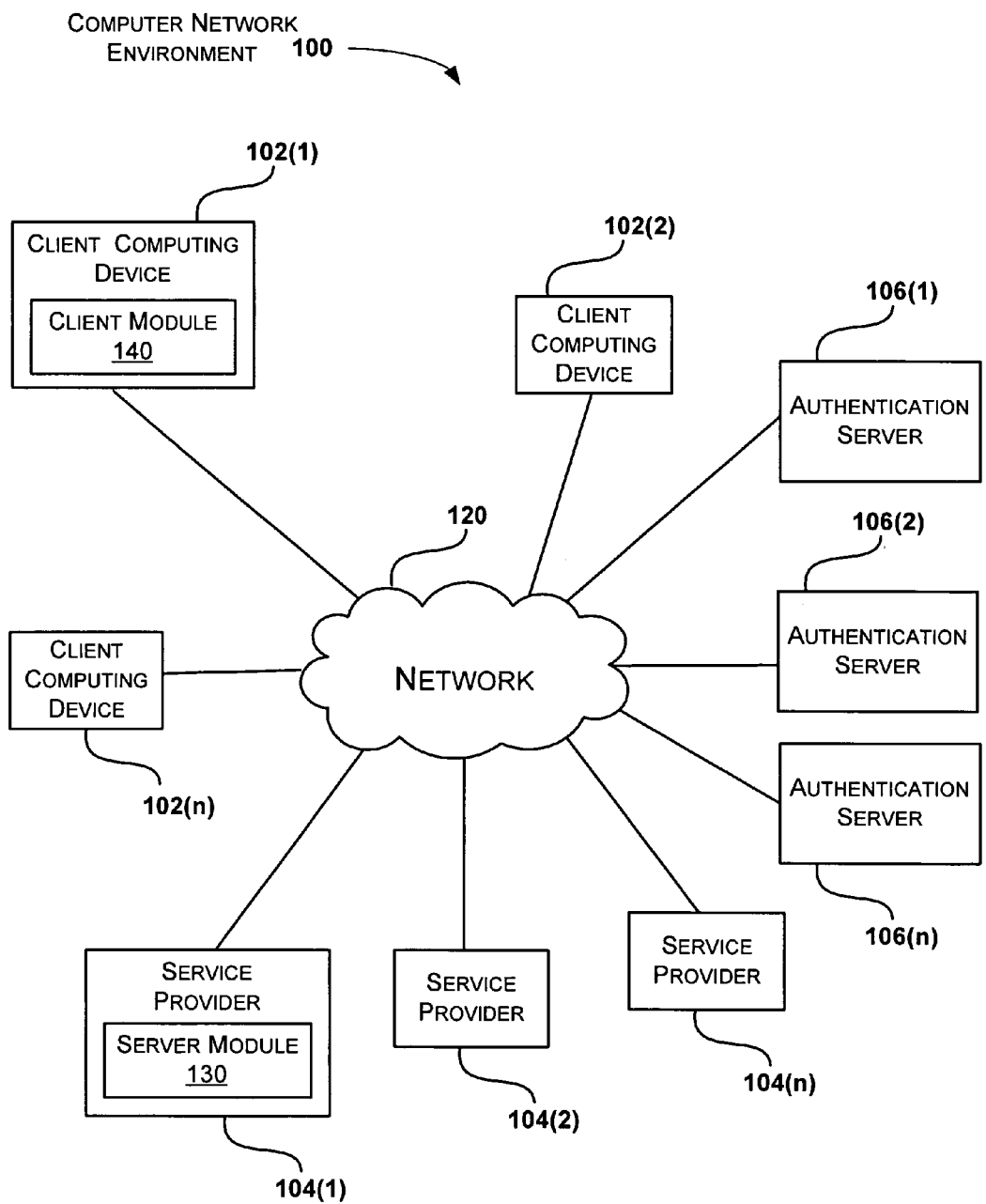
FIG. 1 illustrates an exemplary implementation of a computer network environment that includes several client computing devices that may communicate with one or more service providers.

FIG. 1 illustrates an exemplary implementation of a computer network environment 100 that includes several client computing devices 102(1)-102(n) that may communicate with one or more service providers 104(1)-104(n). Bidirectional communication between the client computing devices 102(1)-102(n) and the service providers 104(1)-104(n) is facilitated with a network 120 (e.g., the Internet). Authentication servers 106(1)-106(n) are also interfaced with the network 120. One or more authentication servers 106 work together to provide authentication services to the client computing devices 102(1)-102(n) and the service providers 104(1)-104(n). Each authentication server has generally the same functionality as another authentication server.

At any given time, one of the several client computing devices 102(1)-102(n), such as the client computing device 102(1), may require services provided by one of the service providers 104(1)-104(n), such as the service provider 104(1). A subset of the authentication servers 106(1)-106(n) provides technology that allows the client computing device 102(1) to properly authenticate with the service provider 104(1). The service provider 104(1) will generally not provide services to any of the client computing devices 102(1)-102(n) until proper authentication is attained.

The service provider 104(1) and the client computing device 102(1) each establish a relationship with the authentication servers 106(1)-106(n) before requesting authentication services of the servers 106(1)-106(n). After the service provider 104(1) establishes initial contact with the authentication servers 106(1)-106(n), a server module 130 is provided to the service provider 104(1). This server module 130 provides the operational parameters that the service provider 104(1) will need during a relationship registration phase. The server module 130 may be stored directly in a memory, volatile or nonvolatile, of the service provider 104(1). If the service provider 104(1) comprises multiple servers (e.g. a server farm), the server module 130 may be stored on a proper one of those multiple servers.

After obtaining the server module 130, the service provider 104(1) creates a secret encryption key and a corresponding secret decryption key. The secret encryption key is split to create additional keys. In one implementation, the secret key is split using a threshold scheme. However, other splitting schemes may be used as well. A split key is sent securely to each authentication server such as 106(1) with a unique ID that identifies the service provider 104(1). The authentication server 106(1) sends a success response to the service provider 104(1) after the split key and the service provider unique ID are received. The secret decryption key remains at the service provider 104(1) and is never made public to any other entity such as the authentication server 106(1). The server module 130 provides the routines for creating the secret keys and splitting the secret encryption key.

The client computing device 102(1) receives a client module 140. The client module 140 may be a Web browser plug-in module that integrates with a Web browser of the client computer device 102(1). The client module 140 provides the operational parameters required during a relationship registration procedure carried out between the client computing device 102(1) and each authentication server 106(1). The client module 140 may be stored directly in a memory, volatile or nonvolatile, of the client computing device 102(1).

After obtaining the client module 140, the client computing device 102(1) may proceed to register with each authentication server 106(i). This should be done before the client module 140 requests services from one or more of the service providers 104(1)-104(n). The registration process between the client module 140 and an authentication server 106(i) involves using the client module 140. A user of the client computing device 102(1) utilizes the client module 140, via a user interface such as an associated Web browser, to enter a unique username and a password. The client module 140 generates a unique client identifier from the unique username. The client module 140 also generates a client authentication key for the client to authenticate to an authentication server 106(i) from the unique username, password and an authentication server ID that was received with the client module 140. A hashing function may be used to create the client authentication key. The client module 140 sends the client authentication key and the client identifier securely to an authentication server 106(i). After receiving and retaining the client identifier and client authentication key, the server 106(i) will send a success message to the client computing device 102(1).

After registering with each authentication server 106(i), the client computing device 102(1) may use a subset of the authentication servers 106(1)-106(n) to establish authenticated communication with one of the service providers 104(1)-104(n) that has already established a relationship with the authentication servers 106(1)-106(n).

Before requesting authenticated communication with one of the service providers 104(1)-104(n), the client computing device 102(1) will authenticate with a subset of the authentication servers 106(1)-106(n), which will provide authentication services to the client computing device. This authentication procedure establishes session keys used by the client computing device 102(1) and the subset of authentication server 106(1)-106(n) for subsequent confidential communications.

To authenticate, a user of the client computing device 102(1) sends each authentication server 106(i) in the subset an authentication request. Making the authentication request and establishing a session key are facilitated using the client module 140. Each authentication server 106(i) responds to an authentication request by sending the client computing device 102(1) a nonce. The client computing device 102(1), in response, sends the authentication server 106(i) the client identifier and the received nonce encrypted using the client authentication key to the authentication server 106(i). The encryption also includes a client device random number and a client device nonce. The client device random number and client device are generated by the client module 140. The client identifier and client authentication key were created during the registration process discussed above.

The authentication server 106(i) uses the client identifier to retrieve the client authentication key that was created during the registration process. The retrieved client authentication key is used to decrypt the encrypted authentication server nonce, the client device random number and the client device nonce. If decryption is successful and the decrypted authentication server nonce matches the nonce sent to the client by the authentication server in a preceding process, the authentication server 106(i) sends the client 102(1) an encryption that includes an authentication server random number generated at the server 106, the nonce and client device nonce. At this point, both the server 106 and the client 102(1) possess the two random numbers. A hashing function is used on the two random numbers by the server 106(i) and the client 102(1) to create a session key at both ends. This session key is used to establish a secure link between the client computing device 102(1) and the authentication server 106(i) when the client computing device 102(1) uses the authentication sever 106(i) in the subset of chosen authentication servers to establish authenticated communication with one of the service providers 104(1)-104(n).

After obtaining a session key from the authentication server 106(i), the client device 102(1) is ready to request authenticated communication with a service provider already registered with the authentication servers 106(1)-106(n) (e.g., the service provider 104(1)). This request begins at the point the client computing device 102(1) sends an access request to the service provider 104(1). The service provider 104(1) responds by sending its unique ID and a challenge (e.g. a service provider nonce) to the client computing device 102(1). Optionally, the service provider 104(1) may send a list of authentication servers it has already registered with to the client computing device 102(1) so that the client can request authentication services from those servers. If the client has not authenticated with the authentication servers in the list, the client authenticates with the authentication servers in the list and establishes a session key for subsequent confidential communication with each of those authentication servers.

The client computing device 102(1) is now ready to contact each of the authentication servers in the subset of authentication servers, for example authentication server 106(i), to establish authenticated communication with the service provider 104(1). The client computing device 102(1) sends each authentication server 106(i) the service provider unique ID and the service provider nonce. Optionally, the client computing device 102(1) may also send its own client identifier to the authentication service provider 104(1). The authentication server 106(i) should also have the client identifier of the client computing device 102(1) and the session key retained in memory from prior communications between the two devices.

The authentication server 106(i) encrypts the client identifier, a network address such as an IP address of the client computing device 102(1), and the service provider nonce using the split key received previously from the service provider 104(1). This process creates a partial authentication token that is passed on to the client computing device 102(1). The client computing device 102(1) creates an authentication token from the received partial authentication tokens and packages the authentication token with its own client identifier and sends the package to the service provider 104(1). The service provider 104(1) will attempt to decrypt the encrypted authentication token using its secret decryption key. If decryption is successful and the decrypted nonce matches the nonce sent to the client in a preceding authenticated communication, the authenticated communication is successful and access to the service provider's service is granted. The service provider 104(1) notifies the client computing device 102(1) whether authenticated communication is granted.

The advantages of the discussed authentication procedure are at least the following. A service provider's secret keys are only known by the provider. Certainly, authentication servers do not know the secret keys and obtaining a service provider's secret key is generally only possible if significant collusion between various authentication servers were to occur. On a client computing device side, a user's password is never used directly during the authentication process. In fact, each entity in the authentication process, client computing devices and service providers, control their own secrets. This makes the authentication procedure described herein very attractive, as the existence of a trustworthy authority is not required. Trustworthy authorities are used with many other encryption/authentication technologies (e.g., PKI).

Client Device Access to Service Provider Procedure

Figure 2:
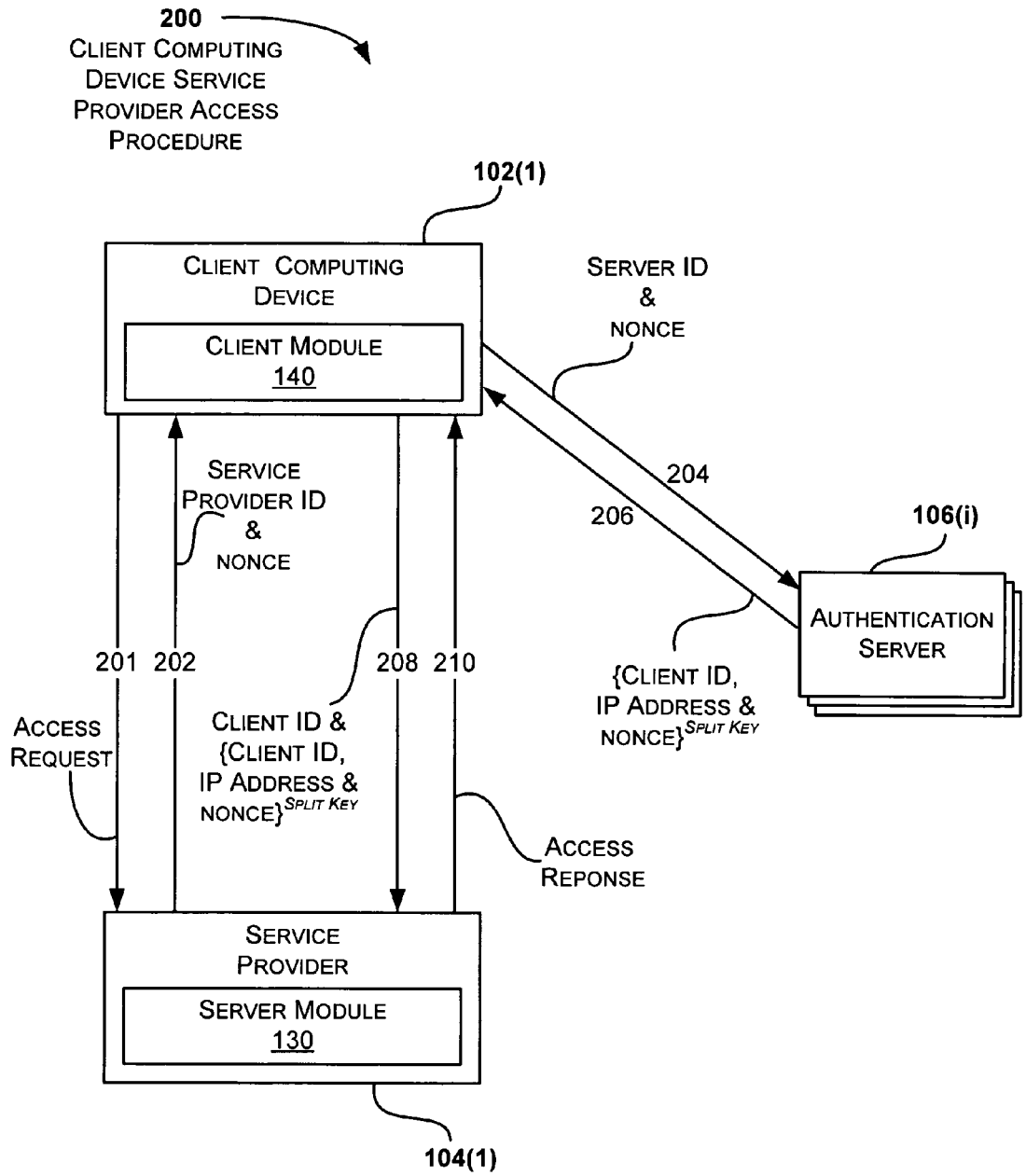
FIG. 2 illustrates an exemplary implementation where a client device requests authenticated communication with a service provider using a client device service provider access procedure.

FIG. 2 illustrates an exemplary implementation where the client device 102(1) requests authenticated communication with the service provider 104(1) using a client device service provider access procedure 200. The authenticated communication is facilitated using subset of the authentication servers 106(1)-106(n). A table I provides details related to notations used in the text that follows.

TABLE I

| | |
|---|---|
| S | A participating service provider. |
| U | A participating client device. |
| $A_i$ | The i-th authentication server. |
| UID | A unique client ID for a participating U. |
| SID | A unique service provider ID for a participating service provider S. |
| $AID_i$ | An unique ID for the i-th authentication server $A_i$. |
| $K_S$ | A secret encryption key generated by and known only to S. |
| $K_S^{-1}$ | A secret decryption key corresponding to $K_S$ and known only to S. |
| $K_S^i$ | The i-th partial share of $K_s$ generated by a threshold scheme. |
| $K_U^i$ | A secret client key for U to authenticate to the i-th authentication server $A_i$. |
| $p_1, p_2$ | Two properly selected prime integers, $p_2 > p_1$. |
| g | A generator in $Z^*_{p_1}$, $2 \leq g \leq p_1 - 2$. |
| $SK_{U,A_i}$ | A session key between a user U and the i-th authentication server $A_i$. |
| $<m>_k$ | A message m encrypted by a symmetric cipher with a key k. |
| $<m>_{k,p}$ | It means $m^k$ mod p where $m \in Z_p$. |
| $n_X$ | Nonce generated by entity X. |
| $r_X$ | A random number generated by entity X. |

TABLE I-continued

| [x] | x is optional in describing a protocol. Square brackets denote optional parameters throughout the description |

The procedure begins when the client computing device 102(1) sends the service provider 104(1) an access request in a communication 201. The service provider 104(1) responds in a communication 202 with SID, $n_S$, [$<g>^{r_S, P_1}$], [a list of t authentication servers $\{A_{d_f}, 1 \leq f \leq t\}$], where t is the threshold for the number of authentication servers needed to provide authentication services. Once the communication 202 is received, the client computing device 102(1) sends SID, $n_S$, [$<g>^{r_U, P_1}$], [UID] to the authentication server 106 in a communication 204. The authentication server 106 responds by sending $<$UID, U, $n_S$, [$<g>^{r_U, P_1}$]$>^{K_{S_f}^{d}, P_2}$ in a communication 206, where U is the network identifier of the client computing device 102(1) such as the client's IP address (IPAddress). The contents of the communication 206 define a partial authentication token. The client computing device 102(1) uses the partial authentication tokens received in the communication 206 with the authentication servers to create an authentication token $<$UID, U, $n_S$, [$<g>^{r_U, P_1}$]$>^{K_S, P_2}$ which is packaged together with UID and [$<n_S>_k$] and sent to the service provider 104(1), where k=$<g>^{r_S r_U, P_1}$. The service provider 104 (1) uses its secret decryption key $k_S^{-1}$ to decrypt the encrypted authentication token, where $$((UID, U, n_S, [<g>^{r_U, P_1}])^{K_S})^{K_S^{-1}} = (UID, U, n_S, [<g>^{r_U, P_1}]) \bmod p_2.$$

Based on the above decryption and the additional information received with the authentication token, the service provider 104(1) will send an access response back to the client computing device 102(1) in a communication 210 indicating if authenticated access is granted. The optional use of a generator (g) in $Z^*_{p_1}$ during the authenticated communication provides a way to generate a session key which is used for subsequent secure communication between the client computing device 102(1) and the service provider 104(1) after the authenticated session is established.

The communications 204 and 206 are secure using a session key established between the client computing device 102(1) and an authentication server 106(i). The client computing device 102(1) and the authentication server 106(i) are each in possession the session key. The specifics of creating such a session key are described later.

The various discussed communications are facilitated using the client and server modules 140 and 130. However, the various communications and instructions may be carried out by any device enabled to carry out such communications and instructions, thereby providing the described client device access to service provider procedure/method.

Service Provider Registration Procedure

Figure 3:
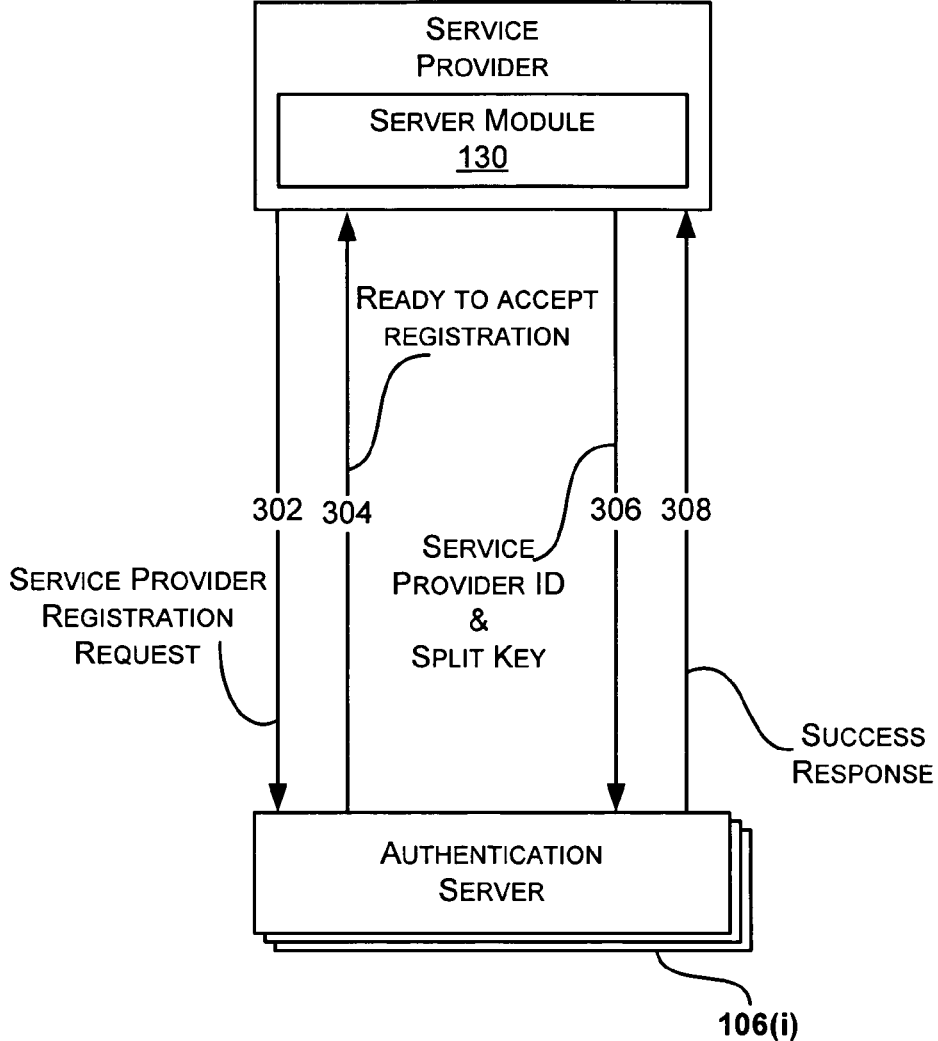
FIG. 3 illustrates an exemplary implementation where a service provider registers with an authentication server using a service provider registration procedure.

FIG. 3 illustrates an exemplary implementation where the service provider 104(1) registers with the authentication server 106(i) using a service provider registration procedure 300. The service provider registration procedure 300 is carried out before a service provider may benefit from the authentication services offered by an authentication server. The table I above provides details related to notations used in the text that follows.

Before the procedure starts, the service provider 104(1) downloads and installs a server module 130. The server module 130 in this implementation provides the functionality that allows the service provider 104(1) to process authentication related requests and communications to and from the authentication server 106(i). The procedure begins when the service provider 104(1) sends the authentication server 106(i) a communication 302 requesting service provider registration. The authentication server 106(i) responds with a communication 304 that informs the service provider 104(1) that it is ready to accept registration.

The service provider 104(1) uses the server module 130 to complete the service provider registration procedure illustrated in FIG. 3. The service provider 104(1) generates a secret key $K_S$, $1 \leq K_S \leq p_2-2$, and calculates $K_S^{-1}$ such that $K_S^{-1} K_S = K_S K_S^{-1} = 1 \bmod (P_2-1)$. Next, the service provider 104(1) uses a (t, n) threshold scheme to split $K_S$ into n split key shares $K_S^i$, $1 \leq i \leq n$. One of these split keys $\{K_S^i\}$ and the SID are sent in a secure communication 306 to each authentication server 106(i). The authentication server 106(i) stores the split key $K_S^i$ and the SID for use during the client device service provider access procedure 200 discussed in connection with FIG. 2. Having received and stored the split key $K_S^i$ and the SID, the authentication server 106(i) sends the service provider 104(1) a success response in a communication 308.

Various discussed communications are facilitated using the server module 130. However, the various communications and instructions may be carried out by any device enabled to carry out such communications and instructions, thereby providing the described service provider registration procedure/method.

Client Device Registration Procedure

Figure 4:
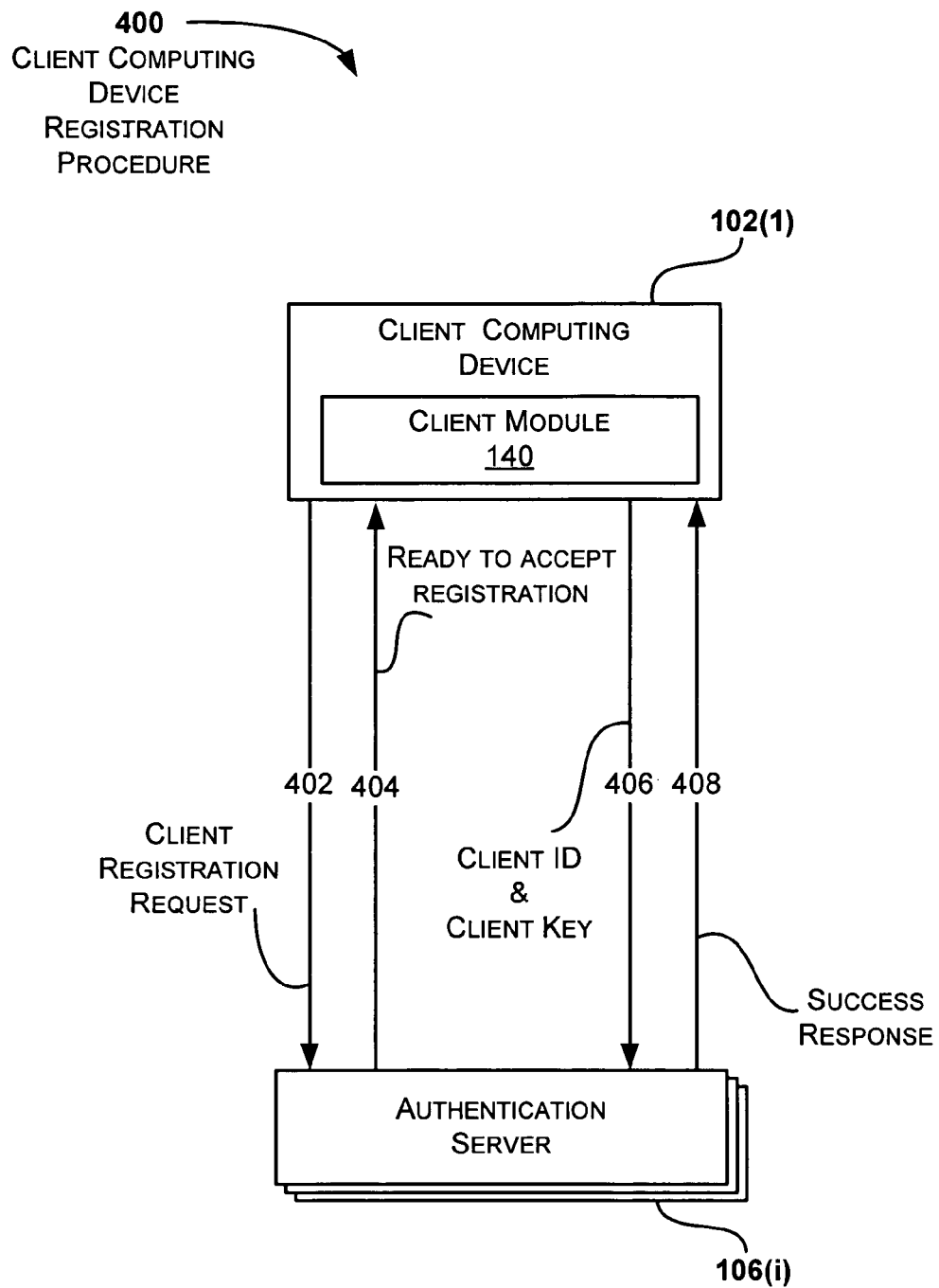
FIG. 4 illustrates an exemplary implementation where a client computing device registers with an authentication server using a client device registration procedure.

FIG. 4 illustrates an exemplary implementation where the client computing device 102(1) registers with each authentication server 106(i) using a client device registration procedure 400. The client device registration procedure 400 is carried out before a client computing device may benefit from the authentication services offered by an authentication server. The table I above provides details related to notations used in the text that follows.

Before the procedure starts, the client computing device 102(1) downloads and installs a client module 140. The client module 140 in this implementation provides the functionality that allows the client computing device 102(1) to process communications to and from each authentication server 106 (i). The procedure begins when the client computing device 102(1) sends the authentication server 106(i) a communication 402 requesting client computing device registration. The authentication server 106(i) responds with a communication 404 that informs the client computing device 102(1) that it is ready to accept registration.

The client computing device 102(1) uses the client module 140 to create a unique client ID UID from a user name input by a user of the client computing device 102(1). The UID may be created by hashing the user name, or hashing parts of the user name. Another process that creates a unique client ID UID from the user name may be used as well. The client computing device 102(1) then uses the client module 140 to create a client key $K_U^i$=hash (UserName, Password, $AID_i$), $1 \leq i \leq n$ which will be used in the client computing device authentication procedure 500 with the authentication server 106(i) shown in FIG. 5. The client key may be created using the user name only as well. The $AID_i$ identifies an i-th authentication server, in this case the authentication server 106(i).

The client computing device 102(1) sends UID, $K_U^i$, $A_i$, $1 \leq i \leq n$ to the authentication server 106(i) by way of a secure communication 406. The authentication server 106 retains the unique client ID UID and the client key $K_U^i$ for later use. In particular, the authentication server uses the unique client ID UID and the client key $K_U^i$ when the client computing device 102(1) makes a request for authentication communication with a service provider. The process of authentication with a service provider generally will require a secure communications between the client computing device 102(1) and an authentication server 106(i); the unique client ID UID and the client key $K_U^i$ facilitate the generation of a session key used for this purpose.

Various discussed communications are facilitated using the client module 140. However, the various communications and instructions may be carried out by any device enabled to carry out such communications and instructions, thereby providing the described client computing device registration procedure/method.

Client Device Authentication Procedure

Figure 5:
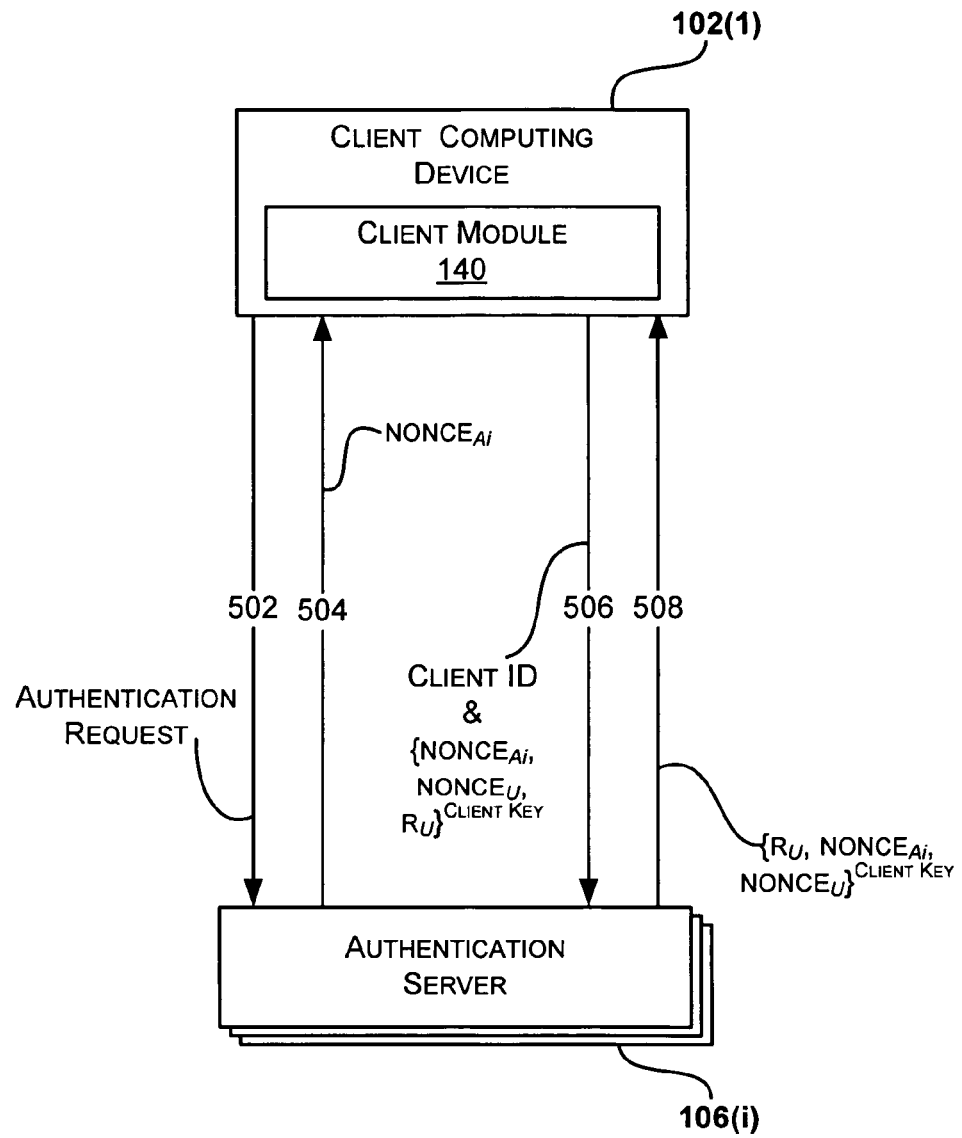
FIG. 5 illustrates an exemplary implementation where a client computing device authenticates with the authentication server using a client computing device registration procedure.

FIG. 5 illustrates an exemplary implementation where the client computing device 102(1) authenticates with an authentication server 106(i) using a client computing device authentication procedure 500. The client computing device authentication procedure 500 is carried out to authenticate a client computing device 102(1) with an authentication server 106(i) and to establish a session key that is used by the client computing device and the authentication server while the client device is attempting to establish authenticated communications with a service provider. The table I above provides details related to notations used in the text that follows.

The procedure begins when the client computing device 102(1) sends an authentication server 106(i) a communication 502 requesting authentication. The authentication server 106(i) responds with a communication 504 that includes a nonce $n_{A_i}$. The client computing device 102(1) responds, aided by the client module 140, with a communication 506 that includes the unique client ID UID and an encryption $<r_U, n_U, n_{A_i}>K_U^i$. The authentication server 106(i) will use the client key $K_U^i$ received in a previous communication to attempt to decrypt the encryption $<r_U, n_U, n_{A_i}>K_U^i$. If the decryption is successful and the decrypted nonce matches the nonce $n_{A_i}$ sent to the client in a preceding process, the authentication server 106(i) sends the client computing device 102 (1) a communication 508 that includes $<r_{A_i}, n_{A_i}, n_U>K_U^i$ or a failure message.

At this point, both the client computing device 102(1) and the authentication server 106 have the random number values $r_U, r_{A_i}$. Using these random number values, both the client computing device 102(1) and the authentication server 106(i) compute a session key $SK_{U, A_i}=\text{hash}(r_U, r_{A_i})$. This session key is used when the client computing device 102(1) contacts the authentication server 106(i) to request authenticated communication with a service provider. The use of the session key in conjunction with establishing authenticated communication with a service provider is discussed in detail earlier in this document.

Various discussed communications are facilitated using the client module 140. However, the various communications and instructions may be carried out by any device enabled to carry out such communications and instructions, thereby providing the described client computing authentication procedure/method.

Exemplary Computing Devices

Figure 6:
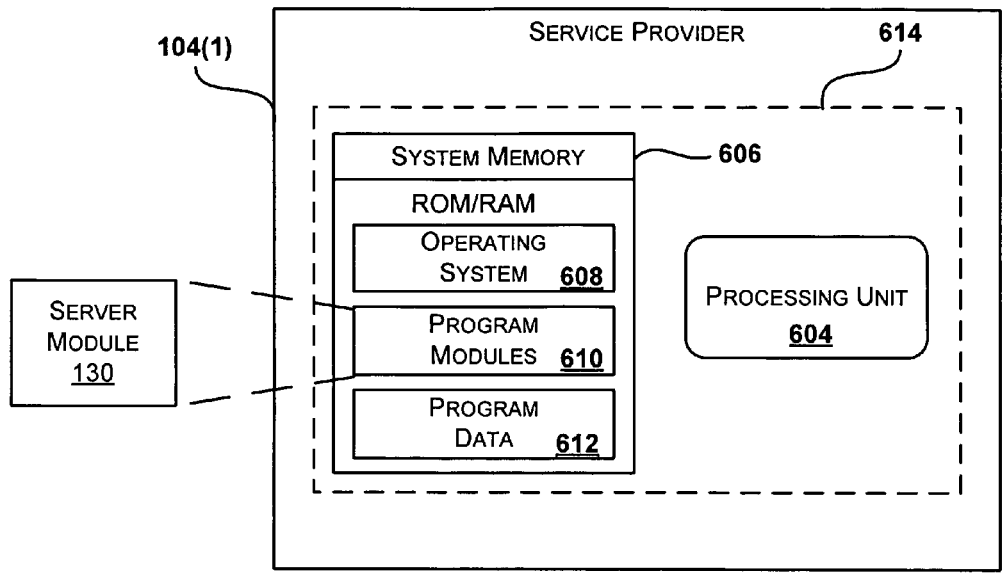
FIG. 6 is an illustrative computing device that may be used to implement a service provider.
Figure 7:
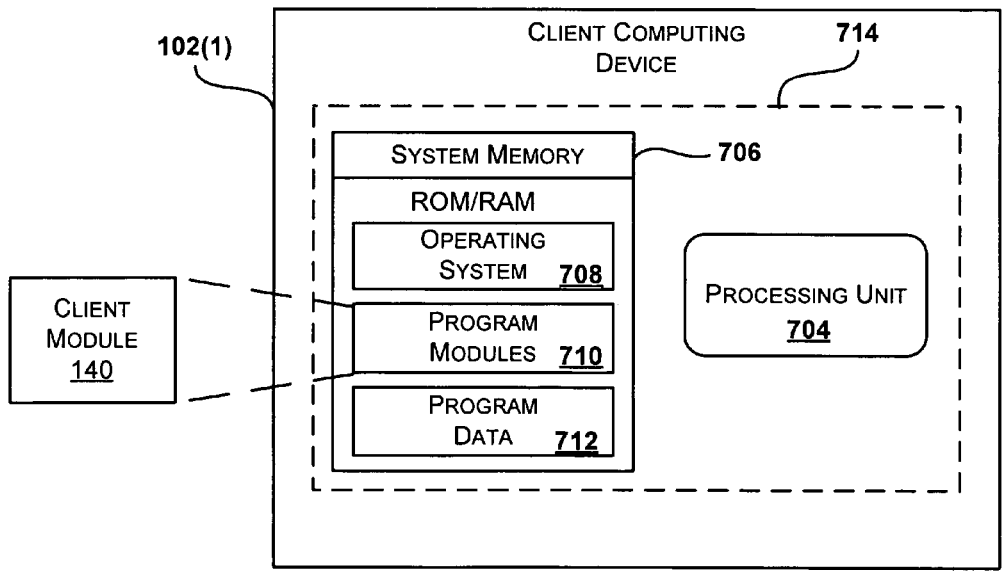
FIG. 7 is an illustrative computing device that may be used to implement a client computing device.
Figure 8:
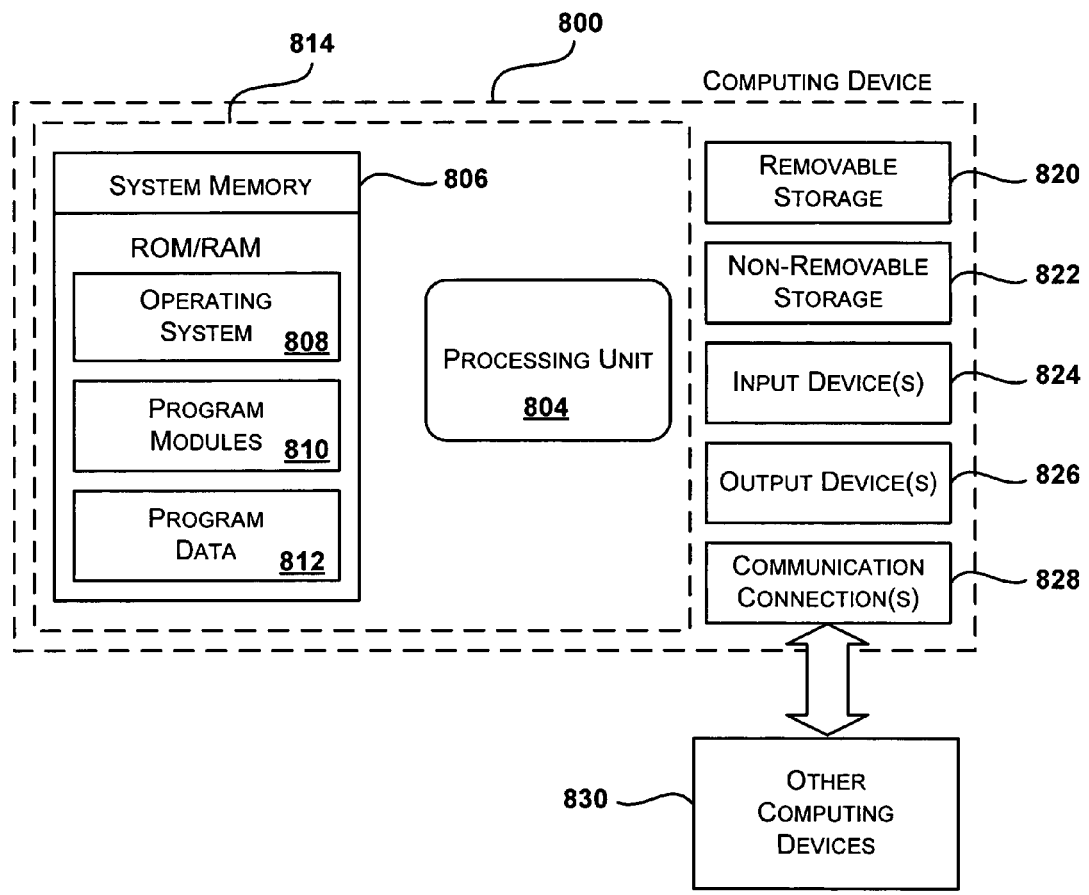
FIG. 8 is an illustrative computing device that may be used to implement an authentication server.

FIGS. 6-8 illustrate exemplary computing devices that may be used to implement the described procedures and methods. FIG. 6 illustrates an exemplary implementation of a service provider 104(1); FIG. 7 illustrates an exemplary implementation of a client computing device 102(1); and FIG. 8 illustrates an exemplary implementation of a computing device 800. An authentication server, such as the authentication server 106(i), may employ the operational elements described in connection with the computing device 800. This is also true for the client computing devices and service providers discussed herein.

FIG. 6 is an illustrative computing device that may be used to implement a service provider 104(1). In a very basic configuration, the computing device includes at least one processing unit 604 and a system memory 606. Depending on the exact configuration and type of the computing device 600, the system memory 606 may be volatile (such as RAM), non-volatile (such as ROM, flash memory, etc.) or some combination of the two. The system memory 606 typically includes an operating system 608, one or more program modules 610, and may include program data 612. At least one of the program modules 610 includes a server module 130.

The computing device may have additional features or functionality. For example, the computing device may also include additional data storage devices (removable and/or non-removable) such as, for example, magnetic disks, optical disks, or tape. Computer storage media may include volatile and nonvolatile, removable and non-removable media implemented in any method or technology for storage of information, such as computer readable instructions, data structures, program modules, or other data. The system memory 606 is one example of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device. Any such computer storage media may be part of the device. The computing device may also have input device(s) such as keyboard, mouse, pen, voice input device, touch input device, etc. Output device(s) such as a display, speakers, printer, etc. may also be included. These devices are well know in the art and need not be discussed/illustrated at length.

The computing device may also contain a communication connection that allows the device to communicate with other computing devices, such as over a network. Such a network is shown as the network 120 of FIG. 1. The communication connection(s) is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media can be any available media that can be accessed by a computer. By way of example, and not limitation, computer readable media may comprise "computer storage media" and "communications media."

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

FIG. 7 is an illustrative computing device that may be used to implement a client computing device 102(1). In a very basic configuration, the computing device includes at least one processing unit 704 and a system memory 706. Depending on the exact configuration and type of the computing device 700, the system memory 706 may be volatile (such as RAM), non-volatile (such as ROM, flash memory, etc.) or some combination of the two. The system memory 706 typically includes an operating system 708, one or more program modules 710, and may include program data 712. At least one of the program modules 710 includes a client module 140.

The computing device may have additional features or functionality. For example, the computing device may also include additional data storage devices (removable and/or non-removable) such as, for example, magnetic disks, optical disks, or tape. Computer storage media may include volatile and nonvolatile, removable and non-removable media implemented in any method or technology for storage of information, such as computer readable instructions, data structures, program modules, or other data. The system memory 706 is one example of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device. Any such computer storage media may be part of the device. The computing device may also have input device(s) such as keyboard, mouse, pen, voice input device, touch input device, etc. Output device(s) such as a display, speakers, printer, etc. may also be included. These devices are well know in the art and need not be discussed/illustrated at length.

The computing device may also contain a communication connection that allows the device to communicate with other computing devices, such as over a network. Such a network is shown as the network 120 of FIG. 1. The communication connection(s) is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media can be any available media that can be accessed by a computer. By way of example, and not limitation, computer readable media may comprise "computer storage media" and "communications media."

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

FIG. 8 is an illustrative computing device 800 that may be used to implement an authentication server, or any other computing device described herein. In a very basic configuration, the computing device 800 includes at least one processing unit 804 and a system memory 806. Depending on the exact configuration and type of the computing device 800, the system memory 806 may be volatile (such as RAM), non-volatile (such as ROM, flash memory, etc.) or some combination of the two. The system memory 806 typically includes an operating system 808, one or more program modules 810, and may include program data 812.

The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage 820 and a non-removable storage 822. Computer storage media may include volatile and nonvolatile, removable and non-removable media implemented in any method or technology for storage of information, such as computer readable instructions, data structures, program modules, or other data. The system memory 806, removable storage 820 and the non-removable storage 822 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 800. Any such computer storage media may be part of the device 800. The computing device 800 may also have an input device(s) 824 such as keyboard, mouse, pen, voice input device, touch input device, etc. An output device(s) 826 such as a display, speakers, printer, etc. may also be included. These devices are well know in the art and need not be discussed at length.

The computing device 800 may also contain a communication connection 828 that allow the device to communicate with other computing devices 830, such as over a network. Such a network is shown as the network 120 of FIG. 1. The communication connection(s) 828 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media can be any available media that can be accessed by a computer. By way of example, and not limitation, computer readable media may comprise "computer storage media" and "communications media."

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

While example embodiments have been illustrated and described, it is to be understood that the invention is not limited to the precise configuration and resources described above. Various modifications, changes, and variations apparent to those skilled in the art may be made in the arrangement, operation, and details of the disclosed embodiments herein without departing from the scope of the claimed invention.

What is claimed is:

1. A method performed at a computing device to provide services to at least one other computing device, the method comprising:
   receiving an authentication request that includes at least a client identifier and an encrypted authentication token derived from a partial authentication token encrypted with a split key generated from a secret key known only by the computing device, the partial authentication token including the client identifier, a network address and a nonce;
   attempting to decrypt the encrypted authentication token using the secret key; and
   granting authenticated communication if decryption is possible with the secret key and a decrypted content of the encrypted authentication token is acceptable.

2. The method according to claim 1, wherein the encrypted authentication token includes a client identifier and a challenge.

3. The method according to claim 2, wherein the client identifier identifies a client device desiring authenticated communication with the computing device to provide services to at least one other computing device.

4. The method according to claim 2, wherein the challenge is supplied by the computing device to provide services to at least one other computing device attempting to decrypt the encrypted authentication token.

5. The method according to claim 1, wherein the encrypted authentication token further includes a network address of a client device.

6. A method performed at an authentication server to provide authentication services, the method comprising:
   establishing a secure session with a session key if such a secure session was not established in a previous procedure;
   receiving a service provider ID, a challenge supplied by a service provider, and a unique ID of a client computing device seeking access to the service provider;
   encrypting the unique ID of the client computing device, a network address of the client computing device and the challenge supplied by the service provider using an encryption key split from a secret key unknown to the authentication server; and
   offering the encryption to the client computing device, the encryption usable when attempting gain access to the service provider.

7. The method according to claim 6, wherein the session key is generated from an authentication key, the authentication key derived from login credentials of the client computing device desiring authentication and an ID of the authentication server.

8. The method according to claim 7, wherein the login credentials include a password and a user name.

9. The method according to claim 6, wherein the unique ID of the client computing device desiring authentication is derived from at least a login name.

10. The method according to claim 7, wherein the authentication key and the unique ID of the client computing device desiring authentication are generated by a module at the client computing device desiring authentication during an authentication procedure establishing a secure session, the authentication key and the unique ID made known to and stored by an authentication in a previous procedure.

11. The method according to claim 6, wherein encrypting further includes encrypting an item or a signature of an item, the item being used to generate another session key for subsequent secure communications.

12. The method according to claim 6, wherein receiving further includes receiving an item, the item will be used to generate another session key for subsequent secure communications.

* * * * *